UNITED STATES PATENT OFFICE.

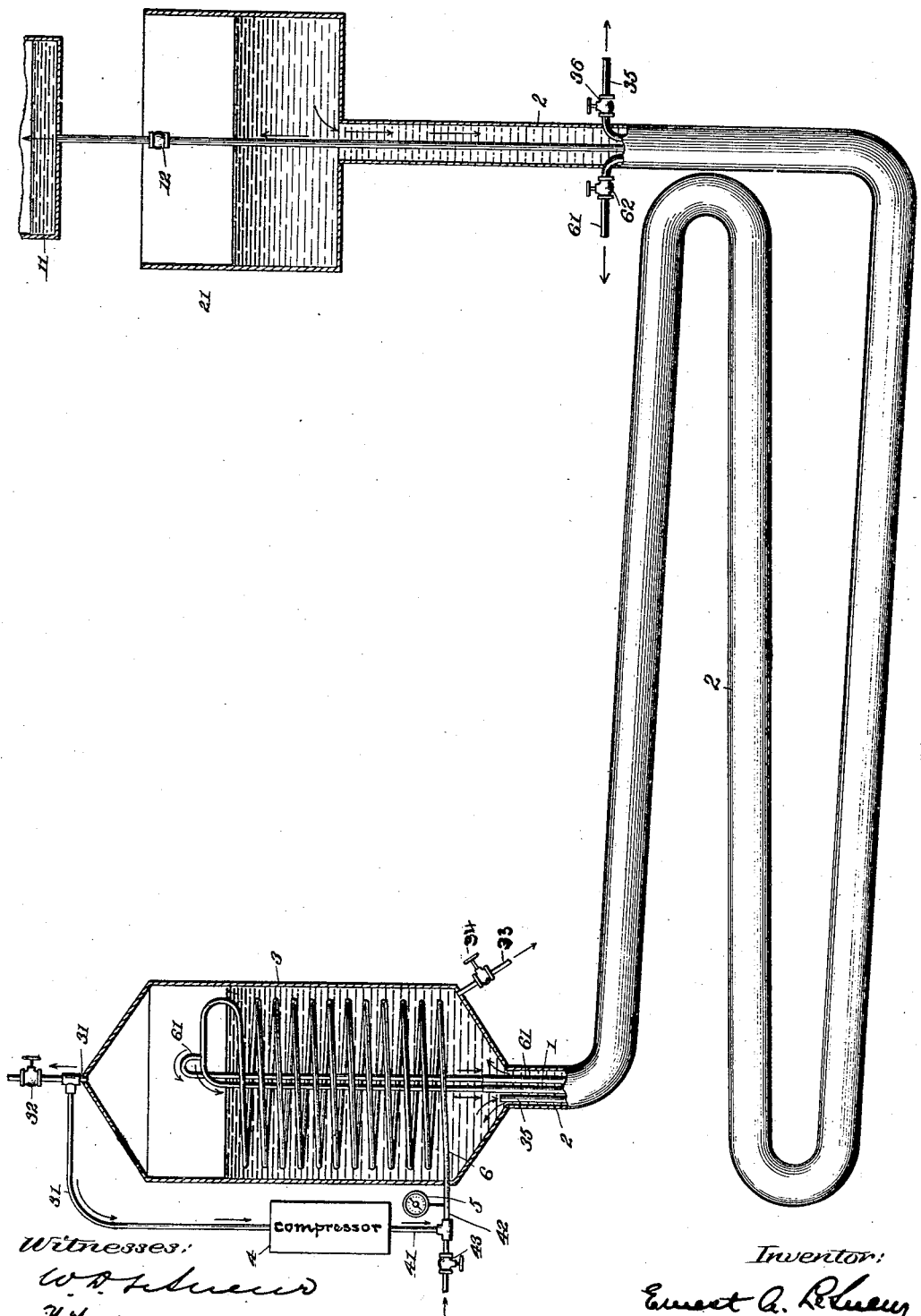

ERNEST A. LE SUEUR, OF SAULT STE. MARIE, ONTARIO, CANADA.

PROCESS OF DISTILLATION.

No. 838,195.      Specification of Letters Patent.      Patented Dec. 11, 1906.

Application filed March 11, 1901. Serial No. 50,729.

*To all whom it may concern:*

Be it known that I, ERNEST A. LE SUEUR, a subject of the King of Great Britain, residing at Sault Ste. Marie, in the Province of Ontario, Dominion of Canada, have invented certain new and useful Improvements in Processes of Distillation, of which the following is a specification.

My invention has for its object to enable evaporation and subsequent condensation to be effected with a minimum expenditure of heat. It utilizes the liberation of latent heat of vaporization of matter already vaporized and whose pressure has been raised subsequently to its becoming vapor to bring about absorption of latent heat by a successive portion of the same matter in the act of becoming vapor. I utilize the heat content of the condensed vapor to effect a preliminary raising of the temperature of the said liquid.

Assuming a typical case—such, for instance, as the distillation of water from an impure liquid mixture which exists to start with at ordinary temperatures, my process is carried out as follows: I pass the said liquid conveniently or at about atmospheric pressure through a passage in a counter-current apparatus, whereby its temperature is gradually raised to a point at which boiling occurs. I withdraw the steam from the chamber in which it is being liberated and raise its pressure by an amount—it may be two pounds per square inch—greater than that under which it was liberated. I then, maintaining the higher pressure on it, return the vapor to contact with one side of the chamber, (or pipe system,) on the other side of which the aforesaid boiling is occurring. Thereby it is caused to condense to the liquid form and give up its latent heat of vaporization to the mixture in the act of boiling in the said chamber. The hot condensed water I pass through a passage in the counter-current apparatus, so as to cause it to give up heat to the said apparatus and its contents prior to being withdrawn from the system. With a view to protecting the system from unnecessary losses of heat the hot portions are lagged with materials of low-heat-conducting powers.

Auxiliary heat will be needed in starting the process, and, furthermore, under circumstances of its being necessary, for instance, to withdraw concentrated liquid directly from the high-temperature portions of the apparatus auxiliary heat may be needed to make good the draft of heat occasioned thereby; but wherever it is not necessary to withdraw such concentrated liquid in a hot condition its heat will preferably be utilized by conveying it through an auxiliary passage in the counter-current apparatus prior to its withdrawal from the system, whereby it is cooled. Where the conditions demand the application of auxiliary heat, the same may conveniently be applied by admitting to the vapor (preferably, as a rule, the compressed vapor) auxiliary vapor from an external source.

Gases dissolved in the liquid to be treated may either be removed in large part prior to admission of said liquid to the system or they may be rejected from the vapor-spaces—as, for instance, by blowing off a vaporous mixture containing them. This mixture may also be conveyed down in temperature through an auxiliary passage in the counter-current apparatus prior to rejection.

In the above I have spoken only of single-effect concentration, and this is usually all that it will be necessary to use. However, by compressing to a higher degree than is required for single effect we may obtain a plurality of effects, as follows: The vapor withdrawn from the chamber in which boiling is occurring under the lowest pressure is withdrawn and compressed to a comparatively high degree. It is then admitted to the condensing-coils or their equivalent, located in thermal communication with the contents of the chamber in which boiling is taking place under the highest pressure and the vapor from this chamber admitted to the condensing-space pertaining to the chamber next below in pressure, and so on, in case the effect is more than double.

Referring now to the drawing, in which the mere principles involved are illustrated without any attempt at showing structural details, liquid to be concentrated is placed in the reservoir 21 and flows through the pipe 2, which constitutes one passage of a counter-current apparatus, into the evaporating-pan 3. It is there exposed to heat from the coil 6, said heat being derived, as hereinafter described, so as to be caused to boil. The vapor given off flows through the pipe 31 to the compressor 4, in which it has its pressure raised by a suitable amount and from which it is delivered through the pipes 41 and 42 to the coil 6 previously mentioned. The pressure after compression is indicated on the gage 5. By its condensation under pressure in coil 6 and by the consequent liberation of latent heat it maintains the act of boiling of the liquid in the pan 3. The condensed vapor flows away through the pipe 1, which constitutes a second passage of the counter-current apparatus above mentioned, and, being brought into thermal communication with the current of liquid to be concentrated flowing in the opposite direction in the pipe 2, it is caused to give up its heat to said current and arrive at the tank 11 past the check-valve 12, which prevents false flow, in a cool condition.

In starting the system live steam from an outside source may conveniently be admitted past the valve 43 to the coil 6, so as initially to raise the temperature of the liquid in 3. The same supply may also be made use of during regular operation in case the heat losses are greater than the gains.

In starting, the space above the liquid in the vessel 3 will usually be filled with air, and as it is undesirable to introduce such a large body of gas into the compressed-vapor spaces it will usually be preferable before starting the compressor 4 to cause boiling of the liquid in 3 by the admission of live steam to the coil 6 and to blow off most or all of said air through the valve 32. In regular operation, however, the latter valve will usually be kept shut and rejection of the uncondensable gases in the vapor be accomplished through the valve 62. This valve permits egress of fluid from the low-temperature end of the pipe 61, which draws from the top of the coil 6. The vaporous mixture of which said coil is relieved through said pipe 61 flows in counter-current to the current of liquid from 21, ascending in temperature, and a portion of its heat, including the latent heat of that portion of the contained vapor which condenses, is given up to said liquid. In the same way hot concentrated liquid has its temperature utilized where possible by being drawn away from the pan 3 through the pipe 35 past the valve 36. The pipe 33 and the valve 34 give an alternative means of withdrawing the contents of the pan in the hot state where necessary.

Besides the parts shown the hot portions of the system will be thoroughly lagged with materials of low-heat-conducting powers to avoid unnecessary wastes of heat.

I am aware that the principle of raising the latent-heat potential of steam by compressing it is well known, and a notable case in point is patent to Faesch, dated January 25, 1881. However, no such process has hitherto been able to compete in economy with the usual multiple-effect evaporating-pans. My process adds the feature of the efficient utilization of the sensible heat of the hot condensed water and of the hot concentrated mother-liquors, as well as of both the latent and sensible heats of the hot vaporous mixture containing fixed gas, as air, which it is necessary to remove from the vapor-spaces.

What I claim is—

1. The process of effecting distillation of a substance from a liquid containing it which consists in conveying said liquid through a passage in a thermal counter-current apparatus, whereby its temperature is raised, in causing it to liberate the vapor of the said substance, in removing said vapor and suitably raising its pressure, in bringing said vapor into thermal communication with liquid in the act of liberating vapor of the said substance so as to cause liquefaction of the vapor under the higher pressure and to promote liberation of vapor by the said liquid, in conveying the product of said liquefaction through a passage in a thermal counter-current apparatus, whereby it is gradually cooled, and, through another such passage, conveying the concentrated liquid residue from the evaporating-chamber, whereby it also gives up its heat to the incoming liquid, substantially as shown and described.

2. The process of effecting distillation of a substance from a liquid containing it which consists in conveying said liquid through a passage in a thermal counter-current apparatus, whereby its temperature is raised, in causing it to liberate the vapor of the said substance, in removing said vapor and suitably raising its pressure, in bringing said vapor into thermal communication with liquid in the act of boiling so as to cause liquefaction of the vapor under pressure and to promote the said boiling of the liquid, in conveying the product of said liquefaction through a passage in a thermal counter-current apparatus, whereby it is gradually cooled, in removing from the high-temperature portions of the system a hot vaporous mixture containing gas which has made its appearance in the vapor and conveying it through a passage in the counter-current apparatus, whereby it is gradually cooled, substantially as shown and described.

In testimony whereof I affix my signature in presence of two witnesses.

ERNEST A. LE SUEUR.

Witnesses:
G. A. HARCOURT,
LEIF NISFEN.